United States Patent [19]

Simon et al.

[11] Patent Number: 5,698,612
[45] Date of Patent: Dec. 16, 1997

[54] THERMOPLASTICALLY WORKABLE, BIODEGRADABLE MOULDING COMPOSITIONS

[75] Inventors: Joachim Simon, Düsseldorf; Hanns Peter Müller, Odenthal; Dirk Jacques Dijkstra, Köln; Jürgen Engelhardt, Fallingbostel; Volkhard Müller, Bomlitz; Gunter Weber, Fallingbostel, all of Germany

[73] Assignee: Bayer Akteingesellschaft, Germany

[21] Appl. No.: 763,391

[22] Filed: Dec. 11, 1996

[30] Foreign Application Priority Data

Dec. 22, 1995 [DE] Germany ............ 195 48 323.5

[51] Int. Cl.$^6$ ............ C08L 1/32; C08L 77/12
[52] U.S. Cl. ............ 523/128; 524/35; 524/36; 524/37; 524/38; 524/39; 524/40; 524/41; 524/42; 524/43; 524/44; 524/45; 524/46
[58] Field of Search ............ 523/128; 524/35, 524/36, 37, 38, 39, 40, 41, 42, 43, 44, 45, 46

[56] References Cited

U.S. PATENT DOCUMENTS

| | | | |
|---|---|---|---|
| 3,668,157 | 6/1972 | Combs et al. | 524/37 |
| 3,781,381 | 12/1973 | Koleske et al. | 525/411 |
| 3,865,752 | 2/1975 | Lee | 524/39 |
| 4,443,595 | 4/1984 | Namikoshi et al. | 536/58 |
| 4,506,045 | 3/1985 | Waniczek et al. | 524/37 |
| 4,533,397 | 8/1985 | Wingler et al. | 524/37 |
| 5,043,400 | 8/1991 | Tsuruta et al. | 524/35 |
| 5,194,463 | 3/1993 | Krutak et al. | 524/44 |
| 5,446,079 | 8/1995 | Buchanan et al. | 524/41 |

FOREIGN PATENT DOCUMENTS

| | | |
|---|---|---|
| 0 597 478 A1 | 5/1994 | European Pat. Off. . |
| 0 639 600 A2 | 2/1995 | European Pat. Off. . |
| 610 378 14 | 7/1984 | Japan . |
| 0 427 5301 | 2/1991 | Japan . |
| 2 158 081 | 11/1985 | United Kingdom . |

OTHER PUBLICATIONS

J. Environmental Polymer Degradation, vol. 3, No. 1, 1995 (pp. 1–11).
J. of Applied Bacteriology 1986, 61, 225.
Macromolecules 1990, 23, 5240–5250.
Elias, Macromolekule, Huthig and Wepf, Basel 1972, p. 360.
Journal of Applied Polymer Science, vol. 21, 3035–3061 (1977).
Polymer Degradation and Stability 45 (1994) 261–265.
Polymer Engineering and Science, Jan. 1990, vol. 30, No. 2, 71–82.
Polymer Bulletin 27, 345–352 (1991).
International Journal of Pharmaceutics 31 (1986) 55–64.
Macromolecules 1988, 21, 1270–1277.
Kunststoff–Handbuch, vol.3/1, Hanser Verl., Vienna, 1992, p. 419 ff.

*Primary Examiner*—Peter A. Szekely
*Attorney, Agent, or Firm*—Connolly & Hutz

[57] ABSTRACT

The present invention provides thermoplastically workable and completely biodegradable moulding compositions, a process for the preparation thereof and the use thereof as biodegradable materials for the production of, for example, injection-moulded parts, films, fibres or coatings.

7 Claims, No Drawings

THERMOPLASTICALLY WORKABLE, BIODEGRADABLE MOULDING COMPOSITIONS

The present invention relates to thermoplastically workable and completely biodegradable moulding compositions, a process for the preparation thereof and the use thereof as biodegradable materials for the production of, for example, injection-moulded parts, films, fibres or coatings.

The moulding compositions consist either of a binary mixture of a thermoplastic and completely biodegradable fully synthetic plastics material such as, for example, polyesteramide, with a likewise thermoplastically workable completely biodegradable cellulose derivative, or of a ternary mixture with additional biodegradable, thermoplastically workable low-molecular or polymeric components, which are used, for example, for plasticising or for imparting compatibility.

Biodegradable and thermoplastically workable mixtures or blends of fully synthetic polymers and cellulose derivatives have been described. In contrast to a true mixture, which is distinguished by a negative free enthalpy of mixing (Macro-molecules 23, (1990) 5240–5250) and results in homogeneous, transparent materials, in numerous examples cellulose derivatives are described that serve only as mechanical fillers (Elias, Macromoleküle, Hüthig and Wepf, Basel, 1972, page 360 ff.). In this case the cellulose derivatives are not mixed with the fully synthetic polymers at the molecular level.

The fully synthetic components used are preferably biodegradable polyesters such as, for example, polycaprolactone (J. Appl. Polym. Sci. 21, (1977) 3035, Polym. Degr. and Stability 45, (1994) 261–165, Polym. Engineering Science 30, (1990) 71–82, DE 33 22 118, UK 2 158 081, JP 0 427 5301, JP 610 378 14, EP 639 600, U.S. Pat. No. 4,443,595) or polyurethanes (EP 449 041).

Polym. Bull. 27, (1991) 345–352 and Int. J. Pharm. 31, (1986) 55–64 describe mixtures of cellulose derivatives with polyethylene oxides or polyvinyl alcohol (Macromolecules 21, (1988) 1270–1277), the biodegradability whereof is still disputed.

Apart from a few exceptions such as, for example, ethylene vinyl acetate copolymers in certain comonomeric proportions (Kunststoff-Handbuch, Vol. 3/1, Hanser Verl., Vienna, 1992, page 419 ff.), no polymers have been found as mixtures with cellulose derivatives which, from the aspect of transparency and workability, would generally have resulted in thermoplastically workable, homogeneous, transparent moulding compositions (U.S. Pat. No. 4,506,045).

J. Env. Pol. Degr. 3(1995) 1–11, U.S. Pat. No. 5,446,079 and EP 597 478 describe thermoplastically workable, biodegradable mixtures of cellulose esters with aliphatic-aromatic polyesters. There are however still great doubts concerning the complete biodegradability of cellulose esters, particularly of cellulose acetates having DS>1.0, in currently used composting installations (J. Appl. Bacteriology 66, (1986) 225).

U.S. Pat. No. 3,668,157 describes the miscibility of polyester-polyether copolymers with cellulose esters; the homopolymers do not form blends with the cellulose derivatives.

U.S. Pat. No. 3,781,381 describes the miscibility of cellulose esters with polycaprolactone. In J. Appl. Polym. Sci. 21, (1977) 3035, however, blends of this kind are described as being immiscible.

U.S. Pat. No. 4,533,397 describes blends of copolymers of polyester-polycarbonates and cellulose esters.

Biodegradable and thermoplastically workable cellulose derivatives are known in the form of the grafted cellulose-polycaprolactone esters (EP 626 392) or in the form of the cellulose-hydroxypropyl phthalate esters (EP 668 293). There are in some instances still great doubts concerning the biodegradability of cellulose diacetates.

It is the object of the present invention to provide a blend of biodegradable and thermoplastically workable fully synthetic polymers with likewise biodegradable and thermoplastically workable cellulose derivatives, in order to improve the inadequate mechanical material properties of the cellulose derivatives, for example, brittleness, tear resistance and extensibility.

In this connection it has been found, surprisingly and not to be predicted by the person skilled in the art, that cellulose ether esters such as, for example, hydroxypropylcellulose phthalate can be mixed with thermoplastically workable, completely biodegradable polyesteramides, to form transparent, homogeneous materials. This is therefore one of the few exceptions mentioned above wherein there is a good miscibility of cellulose derivatives with fully synthetic polymers. In this connection the thermoplastic workability is distinctly improved by the addition of plasticisers and/or other additives suitable for the cellulose derivatives.

According to the invention the aliphatic polyesteramides can be prepared from

I) an ester component consisting of linear and/or cycloaliphatic bifunctional alcohols such as, for example, ethylene glycol, hexanediol, butanediol, preferably butanediol, cyclohexanedimethanol and in addition optionally small quantities of higher functional alcohols, for example, 1,2,3-propanetriol or neopentyl glycol, and of linear and/or cycloaliphatic bifunctional acids, for example, succinic acid, adipic acid, cyclohexanedicarboxylic acid, preferably adipic acid and in addition optionally small quantifies of higher functional acid, for example, trimellitic acid, or II) an ester component consisting of acid functionalised and alcohol-functionalised structural units, for example, hydroxy-butyric acid or hydroxyvaleric acid or derivatives thereof, for example, $\epsilon$-caprolactone or a mixture or a copolymer of I and II and III) an amide component consisting of linear and/or cycloaliphatic bifunctional and in addition optionally small quantities of higher functional amines, for example, tetramethylenediamine, hexamethylenediamine, isophorone diamine, and of linear and/or cycloaliphatic bifunctional and in addition optionally small quantities of higher functional acids, for example, succinic acid or adipic acid, or IV) an amide component consisting of acid-functionalised and amine-functionalised structural units, preferably $\omega$-lauryl lactam and particularly preferred $\epsilon$-caprolactam, or a mixture of III and IV as the amide component, wherein the ester component I and/or II amounts to at least 30 wt. %, referred to the sum of I, II, III and IV.

The biodegradable copolyesteramides have a molecular weight of at least 10,000 g/mol and exhibit a statistical distribution of the starting materials (monomers) in the polymer. A description of the polyesteramides according to the invention is contained in EP 641 817.

Biodegradable and thermoplastically workable cellulose derivatives which can be used according to the invention are cellulose ether esters, particularly preferred from hydroxyethyl cellulose or hydroxypropylcellulose, which have been prepared by a subsequent esterification of the cellulose ethers.

The preparation of cellulose ethers is described in Encyclopedia of polymer science and engineering, Wiley N.Y., 1985, Vol. 3, page 242 ff.

Suitable epoxides are preferably monoepoxides such as ethylene oxide, propylene oxide, 1,2-epoxybutane, 1,2-epoxyhexane, 1,2-epoxyoctane, 1,2-epoxydecane, 1,2epoxydodecane, hexadecane, octadecane, glycidyl stearate, epoxybutyl stearate, lauryl glycidyl ether, glycidyl methyl ether, glycidyl ethyl ether, glycidyl propyl ether, glycidyl butyl ether, glycidyl tertiary butyl ether, glycidyl acrylate, glycidyl methacrylate, allyl glycidyl ether, butadiene monoxide, glycidol, 3-glycidoxypropyltrimethoxysilane, 3-glycidoxypropyltriethoxysilane, di-N-butylamino-2,3-epoxypropane, diethyl-β-γ-epoxypropyl phosphate, 4-(2,3-epoxypropyl)morpholine and styrene oxide.

The esterification of the cellulose ether can be carded out by a method described in EP-A 668 293, for example, using a lactone such as, for example, β-propiolactone, γ-butyrolactone, β-butyrolactone, γ-valerolactone, glycolid, lactid and particularly preferred ε-caprolactone, to obtain a thermoplastically workable, completely biodegradable cellulose ether ester.

Suitable cellulose ether esters according to the invention can also be prepared according to EP-A 668 293 by esterification of cellulose ethers using dicarboxylic anhydrides such as phthalic anhydride, tetrahydrophthalic anhydride, hexahydrophthalic anhydride, maleic anhydride, succinic anhydride and trimellitic anhydride.

In this connection it is possible to react the free carboxyl group of the dicarboxylic monocellulose ether ester still further with alkylene oxides. Here the proportions can be chosen so that the free carboxylic acids are completely or only partly reacted with alkylene oxide. Likewise the free acidic groups can serve as a starter for the formation of a polymeric ether.

The epoxides used can again be monoepoxides such as ethylene oxide, propylene oxide, 1,2-epoxybutane, 1,2-epoxyhexane, 1,2-epoxyoctane, 1,2-epoxydecane, 1,2epoxydodecane, hexadecane, octadecane, glycidyl stearate, epoxybutyl stearate, lauryl glycidyl ether, glycidyl methyl ether, glycidyl ethyl ether, glycidyl propyl ether, glycidyl butyl ether, glycidyl tertiary butyl ether, glycidyl acrylate, glycidyl methacrylate, allyl glycidyl ether, butadiene monoxide, glycidol, 3-glycidoxypropyltrimethoxysilane, 3-glycidoxypropyltriethoxysilane, di-N-butylamino-2,3-epoxypropane, diethyl-β-γ-epoxypropyl phosphate, 4-(2,3-epoxypropyl)morpholine and styrene oxide.

The conventional plasticisers for cellulose esters can be used as plasticisers or additives, particularly preferably triacetin, triethylene glycol, glycerol, triphenyl phosphate, resorcinol diphosphate, polyethylene glycol, propylene glycol, ethyl lactate, methyl lactate, caprolactone, dimethyl tartrate and diethyl tartrate.

The thermoplastic moulding compositions generally contain from 0.1 to 95 wt. %, preferably 20 wt. % to 55 wt. %, particularly preferred 25 wt. % to 44 wt. % of cellulose ether ester. The thermoplastic moulding compositions preferably contain plasticisers. In general, from 0.1 wt. % to 40 wt. %, preferably 1 to 30 wt. %, particularly preferred 5 to 20 wt. % of plasticisers are added.

The invention also provides a process for the preparation of the thermoplastic and biodegradable moulding compositions according to the invention, characterised in that the cellulose derivatives are first mixed or kneaded with a suitable plasticiser at temperatures of above 120° C., and then intimately mixed with the polyesteramide in a kneader or extruder.

The invention also provides the mouldings, films, moulded parts, fibres or extrudates produced from the thermoplastic moulding compositions according to the invention.

According to DIN 54 900 biodegradation/biodegradability is understood to be as follows:

The biological degradation of a material is a process caused by biological activity which results in the formation of naturally occurring metabolites, accompanied by a change in the chemical structure of the material.

EXAMPLES

Comparative Example 1

60 wt. % of biodegradable polyesteramide from a 60 wt. % proportion of polycapro-lactam and a 40 wt. % proportion of an ester obtained from adipic acid and butanediol is compounded with 27 wt. % of cellulose diacetate and 13 wt. % of triacetin in a twin-shaft extruder Brabender ZSK 32/14 at 2.4 kg/h at a rate of rotation of 40 rev/min and a temperature of the materials of 190° C. and is then injection-moulded to form test pieces. The extruded material is inhomogeneous, turbid and is a multiphase compound.

The examination by the tensile test according to DIN 53 457 yields the following value:

Stress at break: 12.5 m.Pa.

Elongation at break: 4.6%

Example According to the Invention

Example 1

60 wt. % of biodegradable polyesteramide from a 60 wt. % proportion of polycaprolactam and a 40 wt. % proportion of an ester obtained from adipic acid and butanediol is compounded with 34 wt. % of hydroxypropyl cellulose phthalate, which has been further esterified using propylene oxide (DS phthalic acid 1.4, DS propylene oxide 2.5) and previously mixed with 6 wt % of triacetin, in a twin-shaft extruder Brabender ZSK 32/14 at 2.4 kg/h at a rate of rotation of 40 rev/min and a temperature of the materials of 190° C. to form a homogeneous transparent granular material and is then injection-moulded to form test pieces.

The examination by the tensile test according to DIN 53 457 yields the following value:

Stress at break 21 m.Pa.

Elongation at break: 32%

We claim:

1. Thermoplastic moulding compositions containing completely biodegradable polyesteramides and thermoplastically workable cellulose derivatives, and wherein the cellulose derivatives are cellulose ether esters.

2. Moulding compositions according to claim 1, containing a plasticiser.

3. Moulding compositions according to claim 1, wherein the cellulose ether ester is from 0.1 to 99 wt. % of the total moulding composition.

4. Moulding compositions according to claim 3, containing from 20 to 55 wt. % of cellulose ether ester.

5. Moulding compositions according to claim 3, containing from 1 to 30 wt. % of plasticiser.

6. Moulding compositions according to claim 1, containing polyester-amides consisting of I) an ester component selected from the group consisting of linear and cycloaliphatic bifunctional alcohols, linear and cycloaliphatic bifunctional acids, II) and functionalised and alcohol-functionalised structural units, and III) an amide component selected from the group consisting of linear and cycloaliphatic bifunctional amines, linear and cycloaliphatic bifunctional acids, IV) acid-functionalised and amine-functionalised structural units, and a mixture of III and IV as the amide component, wherein the ester component I and/or II amounts to at least 30 wt. % referred to the sum of I, II, III and IV.

7. Moulding compositions according to claim 2, containing from 0.1 to 40 wt. % of plasticiser.

* * * * *